US005907210A

United States Patent [19]
Chaix

[11] Patent Number: 5,907,210
[45] Date of Patent: *May 25, 1999

[54] ASYNCHRONOUS DISCOIDAL ELECTRICAL MOTOR

[75] Inventor: Jean-Edmond Chaix, Pierrevert, France

[73] Assignee: Technicatome Societe Technique pour l'Energie Atomique, Gif Sur Yvette Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/718,962

[22] Filed: Sep. 26, 1996

[30] Foreign Application Priority Data

Sep. 29, 1995 [FR] France .................. 95 11468

[51] Int. Cl.⁶ ........................................ H02K 1/22
[52] U.S. Cl. ............... 310/268; 310/67 R; 310/68 R; 310/213; 310/214; 310/254; 310/258
[58] Field of Search .................. 310/67 R, 68 R, 310/213, 214, 268; 29/596, 597, 592

[56] References Cited

U.S. PATENT DOCUMENTS

| 1,771,936 | 10/1930 | Morrill ................................. 310/212 |
| 1,861,059 | 5/1932 | Johnson ............................... 310/268 |
| 3,261,998 | 7/1966 | Bosco, Jr. et al. ................... 310/268 |
| 3,496,397 | 2/1970 | Andresen ............................. 310/212 |
| 3,827,141 | 8/1974 | Hallerback .......................... 29/596 |
| 4,370,582 | 1/1983 | Addicott et al. ..................... 310/211 |
| 4,500,806 | 2/1985 | Kanayama et al. .................. 310/198 |
| 4,654,552 | 3/1987 | Fritzsche ............................. 310/216 |
| 4,996,457 | 2/1991 | Hawsey et al. ..................... 310/268 |
| 5,168,187 | 12/1992 | Baer et al. .......................... 310/49 R |
| 5,397,953 | 3/1995 | Cho .................................... 310/254 |

FOREIGN PATENT DOCUMENTS

| 0 052 179 A1 | 5/1982 | European Pat. Off. . |
| 2 037 011 | 12/1970 | France . |
| 648442 A5 | 3/1985 | Switzerland . |
| 2 228 626 | 8/1988 | United Kingdom . |

*Primary Examiner*—Elvin G. Enad
*Attorney, Agent, or Firm*—Pearne, Gordon, McCoy & Granger LLP

[57] ABSTRACT

The asynchronous discoidal electric motor has stator (1A, 1B) windings (13) and radial rotor bars (2) embedded in notches (11, 22) opened by a very narrow slit (11, 21). These slits (11, 21) and notches (12, 22) may be machined electrochemically using a wire. Application to asynchronous discoidal electric motors with winding embedded in the stator and with a cartwheel structure on the rotor.

11 Claims, 5 Drawing Sheets

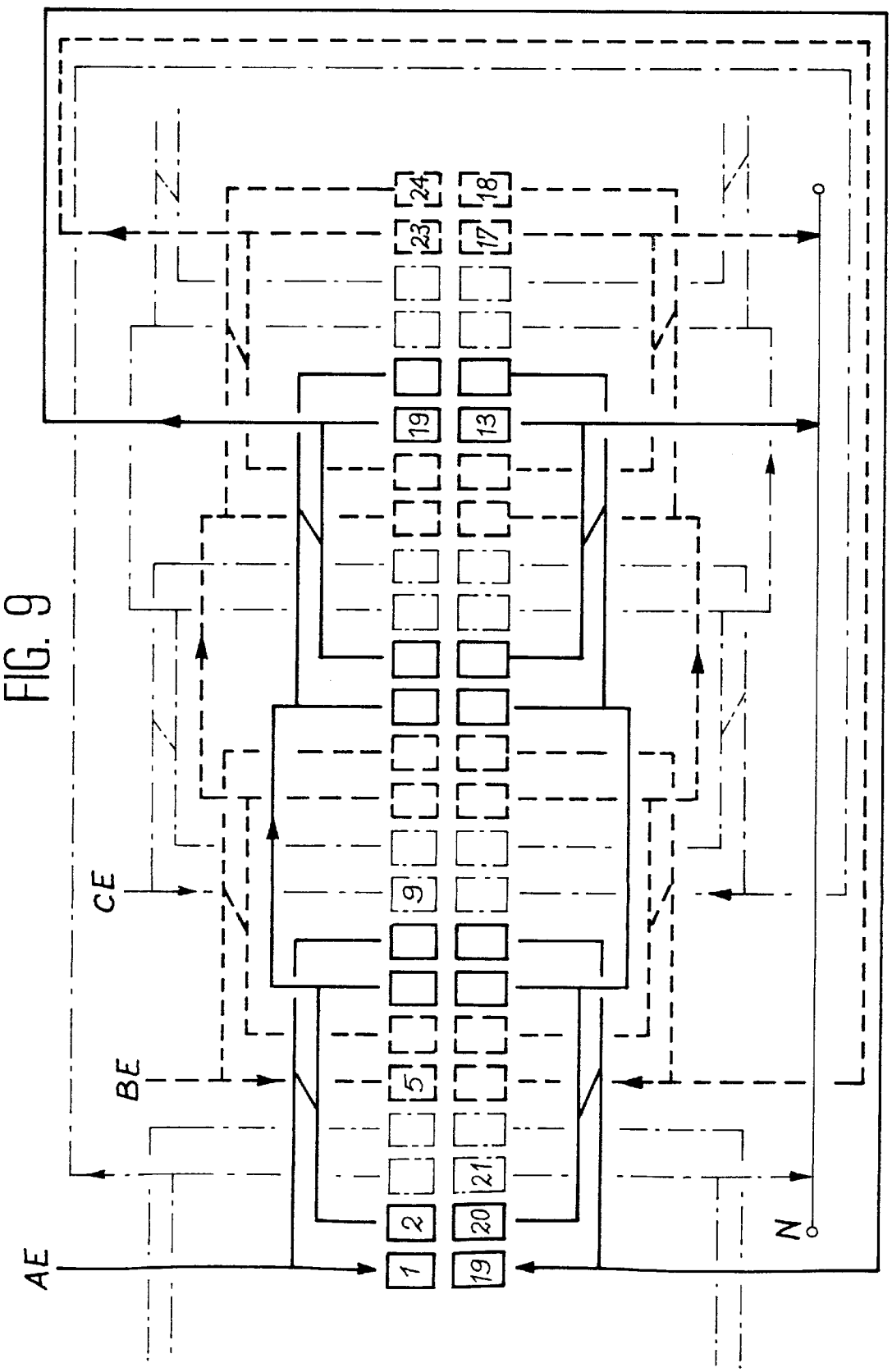

5,907,210

ASYNCHRONOUS DISCOIDAL ELECTRICAL MOTOR

FIELD OF THE INVENTION

This invention concerns asynchronous discoidal electrical motors like those used in short circuit rotors, particularly used with pumps in order to pump high fluid flows at pressures of between 10 and 200 bars ($10^6$ to $10^7$ Pa). This type of assembly may be used in particular for pumping oil wastes or for use in some submarines.

PRIOR ART AND THE PROBLEM

Asynchronous discoidal motors are used for their specific performances and particularly for their compactness. Therefore, several types of discoidal motors include a single discoidal shaped stator, which therefore has a very small axial dimension. The stator may be composed of two parts placed on each side of the two radial faces of the discoidal rotor, these two parts containing electrical windings wound and placed facing the electrical parts of the rotor. The stator windings are frequently wound roughly and/or outside the stator. This has some disadvantages, particularly concerning the uniformity of the rotating field and poor use of the volume of the active material (iron+copper).

Therefore, the need arises to design stators with embedded windings or coils uniformly distributed within the stator structure and not projecting outside it.

SUMMARY OF THE INVENTION

Consequently, the main purpose of the invention is an asynchronous discoidal electric motor comprising:
- a discoidal shaped rotor with radial surfaces, and mounted to rotate around an axis of rotation; and
- a stator composed of two parts placed on each part of the radial surfaces of the rotor and with two radial faces on each of which are placed windings facing the rotor.

According to the invention, stator windings are in radial notches of the stator, each of which has a slit that is narrow compared with the main opening of the notch, such that each notch is almost closed. This arrangement is made so that wires can be inserted in the notches while minimizing the leakage permeance from the notch outlet.

In a preferred embodiment of the invention, windings are wound around a stainless steel casing.

Preferably, the center lines of the notches pass close to the center line of the stator, but not through it.

Preferably, there is a cartwheel shaped electrical structure on each radial surface with two rings, one internal and one external, and radial bars placed in radial notches.

Similarly, the rotor may have a cartwheel shaped electrical structure on each radial surface with slightly incline radial bars, in other words their center lines are close to the axis of rotation of the rotor, but do not intersect it.

In the preferred embodiment of the rotor, the radial bars are each placed in a radial notch.

To ensure that the motor with a short-circuited rotor has sufficient start up torque, the notches in the radial bars may have two sections with different surface areas and be placed at different depths.

The second main purpose of the invention is a process for manufacturing the stator and the rotor notches as defined above.

According to the invention, this machining is done electrochemically using a wire width L less or equal to the width of the notch slit.

LIST OF FIGURES

The invention and its various technical characteristics will be better understood with the reference to the following figures which show:

FIG. 1 contains an exploded view showing the general structure of the motor according to the invention;

FIG. 2 is a partial section showing a first possible cross-section through the bars and rotor notch;

FIG. 3, a front view of the rotor illustrating a possible layout of the bars;

FIG. 4, a cross-section showing a possible structure of the rotor;

FIG. 5 showing a partial section of an embodiment of the stator notch;

FIG. 6, a second possible embodiment of the rotor bars and notch;

FIG. 7, the electrical layout of a first part of the stator,

FIG. 8, the electrical layout of a second part of stator;

FIG. 9, the electrical layout of the connection of the two stator windings.

DETAILED DESCRIPTION OF AN EMBODIMENT OF THE INVENTION

Figure 1:
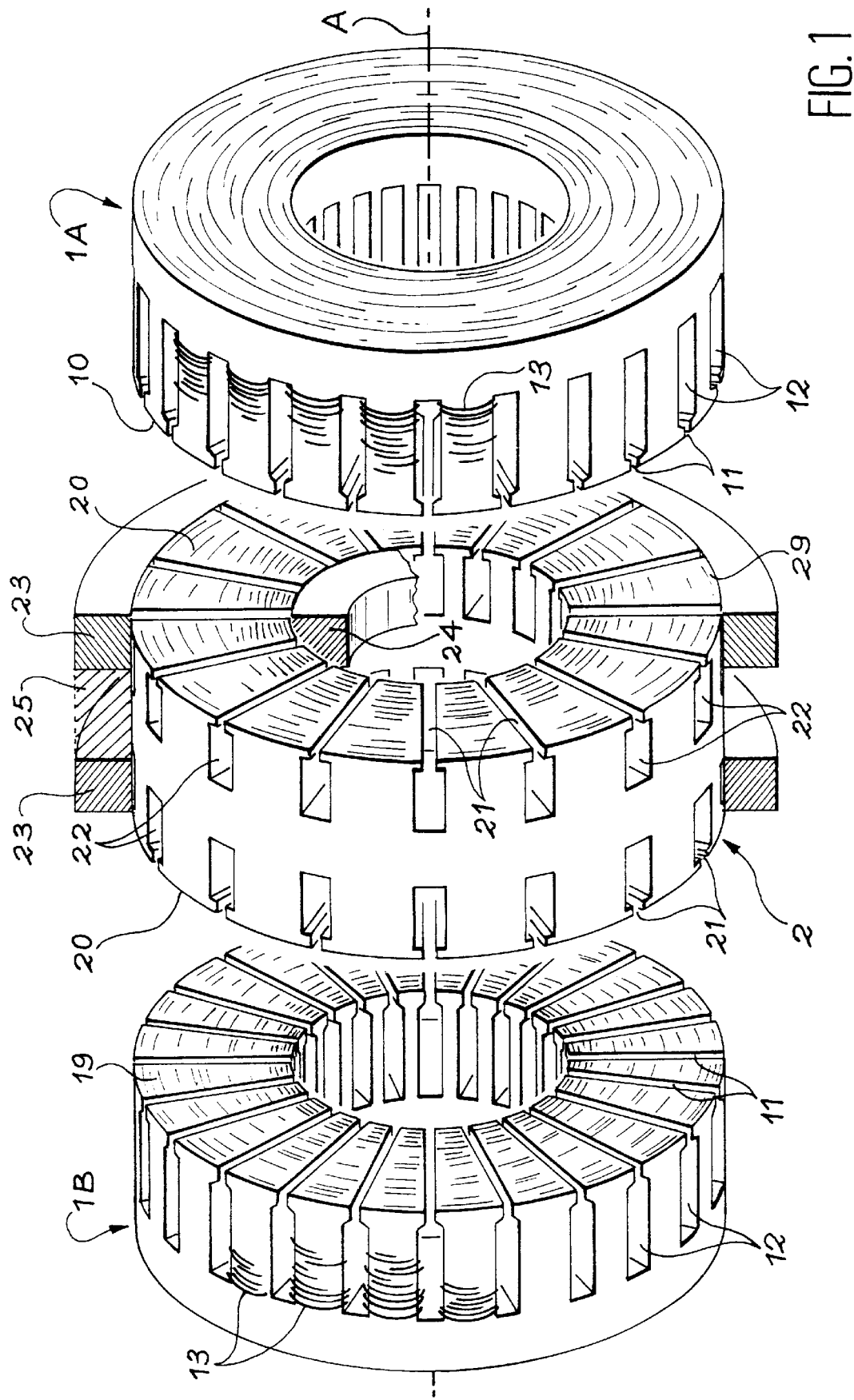

In reference to FIG. 1, the motor according to the invention has the following structure.

The stator is composed of two parts 1A and 1B placed on each side of rotor 2 which must rotate around an axis of rotation A of the motor. This figure simply shows the supporting structure for each of these elements. Parts 1A and 1B of the stator are composed mainly of a strip of electromagnetic material wound about itself, forming an annular structure for each of them. The structure of these two parts 1A and 1B is obtained by winding a flat strip 19 on a hub.

Each of these stator parts 1A and 1B has a radial surface 10 placed in front of rotor 2. This radial surface 10 includes slits 11 each of which provides access to a radial notch 12.

The same slits 21 each lead into a notch 22, and are formed to correspond to them on the two radial surfaces 20 of rotor 2.

The two parts 1A and 1B of the stator are completed by windings 13 wound in notches 12 to form windings or coils for all phases. Thus, the three series of windings for the three phases which alternate at each pitch are thus built up alternatively, the number of pitches, in other words the number of radial notches 12 per pole and per phase, usually being an integer number. It may be fractional in some special cases. The total number of notches 12 is always a multiple of three for a three-phase winding.

The rotor 2 structure is also obtained by winding an electromagnetic strip 29.

Figure 2:
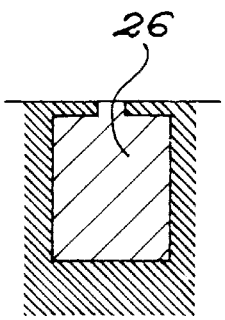
Figure 3:
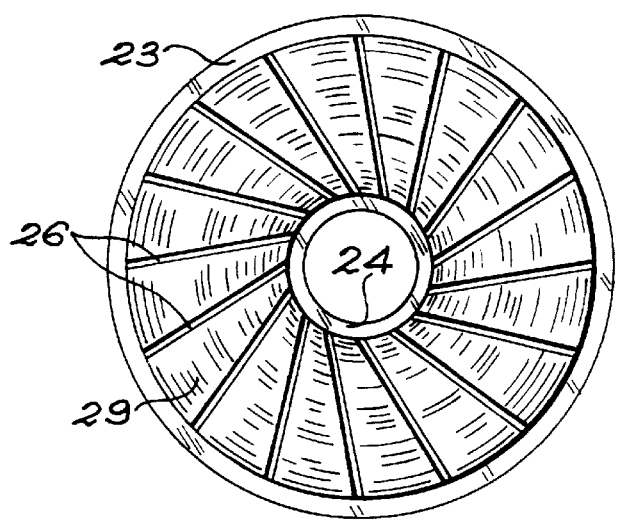

Bars, not shown in FIG. 1 but shown as reference 26 in FIG. 2 made of a conducting metal such as aluminium are placed in machined notches 22 in this rotor 2, forming the radial arms of a conducting cartwheel structure, as shown in FIG. 3. The ends of the radial bars are connected to each other by two internal rings 24 and two external rings 23 which thus short-circuit all bars. This assembly forms a cartwheel structure. It would also be possible to consider a single external ring and a single internal ring connecting radial bars together. However for ease of manufacture, each cage or cartwheel includes an external ring 23 and an internal ring 24. An external central ring 25 and an internal central ring not shown can also be placed between rings 23 and 24 to provide mechanical strength of the wound plate forming the framework of rotor 2.

As shown in FIG. 3, in order to reduce torque gaps during the motor start up phase and to obtain a quieter motor, it would be possible for radial notches 22 to be not perfectly radial, in other words perpendicular to the main center line A of the motor, with their center line passing close to this rotor center line A but not passing through it. This layout is similar to the layout of the spokes in a bicycle wheel. This structure would also be possible for stator windings and notches.

Figure 4:
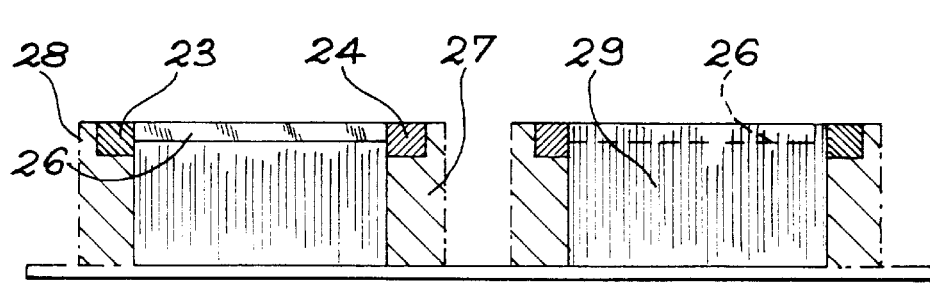

With reference to FIG. 4, the rotor may be assembled using two assembly rings, one internal 27 and the other external 28, between which the strip 29 is wound. Offsets are provided so that the external 23 and internal 24 rings can be positioned.

Figure 5:
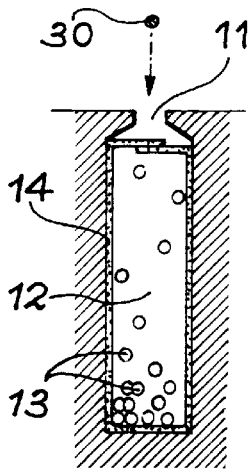
Figure 6:
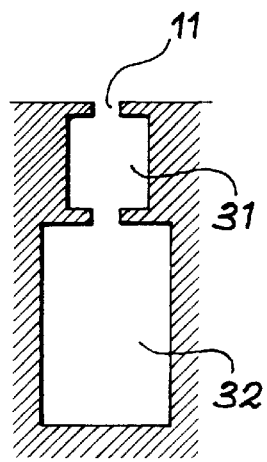

With reference to FIGS. 5 and 6, according to the invention, the stator radial notches 12 and their narrow slits 11 are machined by electrochemistry using a wire 30. The electrochemical machining wire 30 is placed in the direction of notch 12, and the slit 11. It is then moved perpendicularly to its center line describing the entire section of the slit 11 and the radial notch 12. Radial notches 12 can thus be machined to any shape, for example as shown in FIGS. 5 and 6, the width of the slit 11 being at least equal to the width of the wire to be wound.

FIG. 5 shows that stator windings 13 may be surrounded by a dielectric insulating casing 14 to isolate windings from the earth.

Note that the rotor notches may be machined in the same way.

The cross-section of rotor notches described in FIG. 6 shows a radial notch containing two successive cavities 31 and 32 connected together, the first opening on slit 11. These two successive sections 31 and 32 are also filled by two windings or bars of different sections. This allows the rotor to start up with a sufficiently large torque, with an acceptable start up current.

In the embodiment described in this description, the rotor has sixteen notches 22. Correspondingly, the two stators each have twenty-four notches 12.

Figure 7:
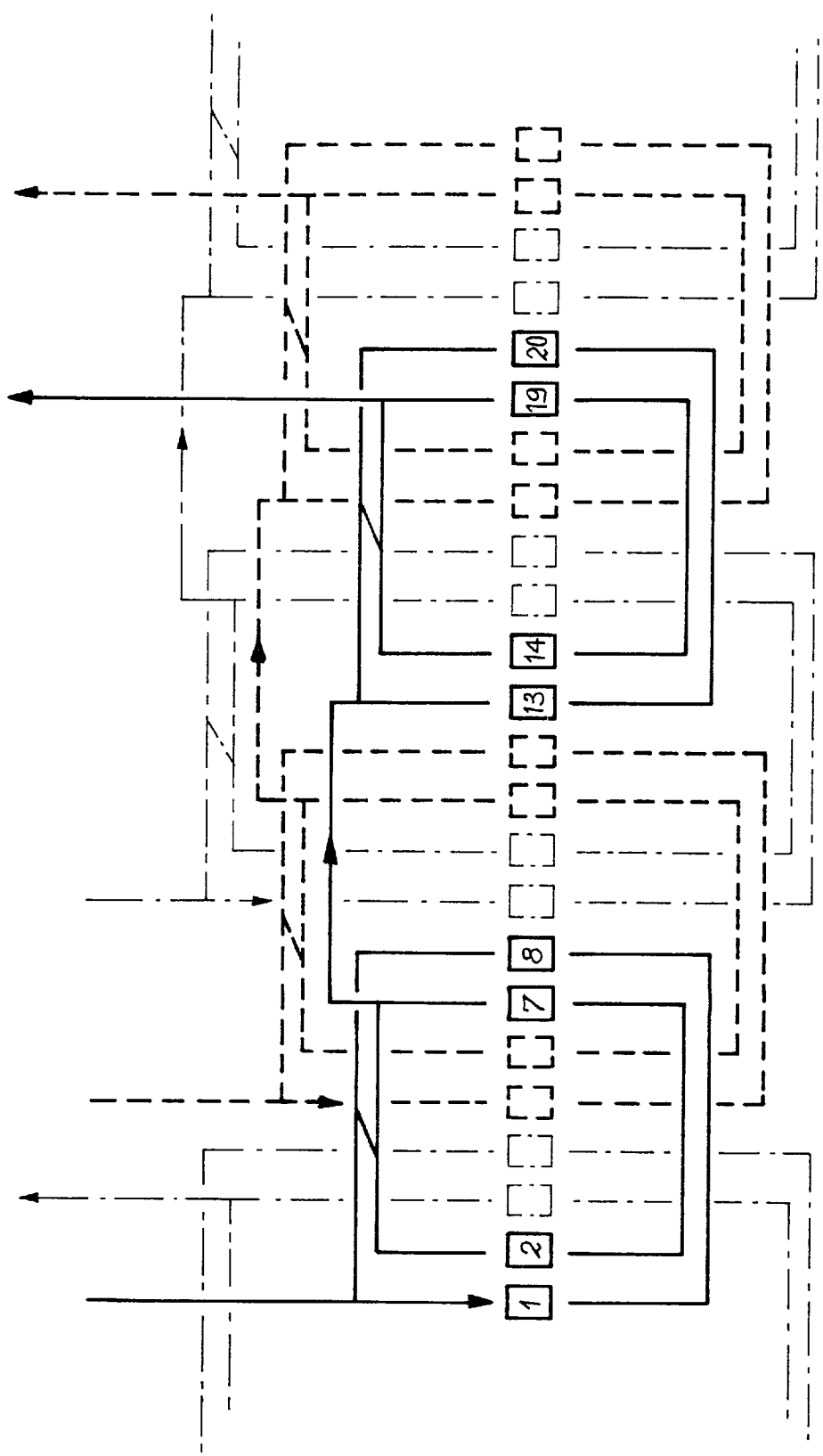

With reference to FIG. 7 and numbering the twenty-four notches, the winding of the first stator may start at notch number 1. Each phase occupies two consecutive notches four times in sequence with an offset of six notches corresponding to one polar pitch. The first phase, the winding of which starts at notch 1, terminates at notch 19. The inputs of the three phases are thus offset successively by eight notches or 120°, and occupy the twenty-four notches on this first stator.

Figure 8:
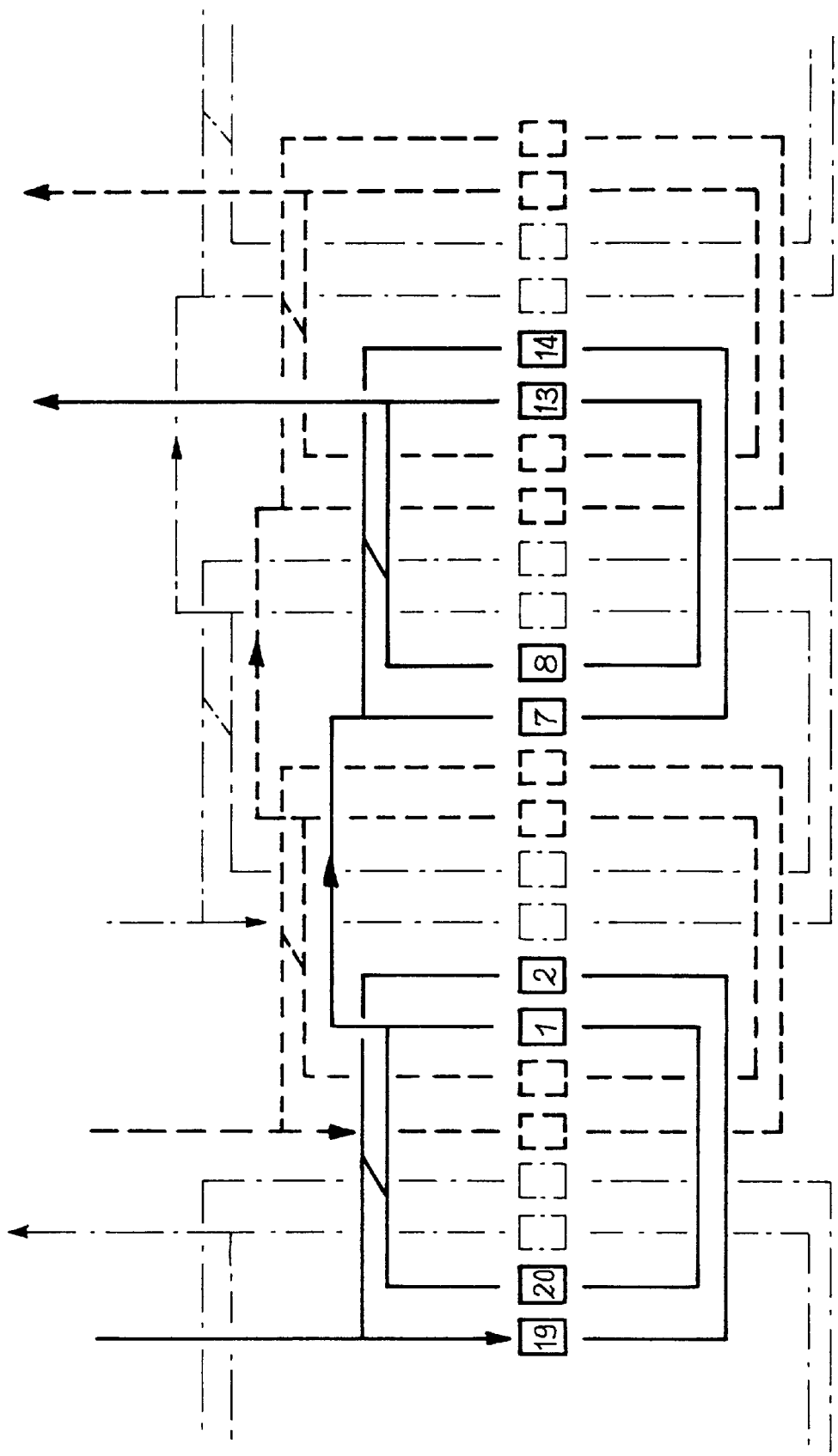

With reference to FIG. 8, the winding of the second stator then starts at notch 19 and for the same phase, terminates at notch 13. The three phases in this second stator are also placed alternately.

FIG. 9 shows the position and the connection of the two stators with respect to each other. Note that there is an angular offset of six notches between these two stators in order to produce an offset of one polar pitch. Furthermore, the output 19 from the first phase of the first stator is connected to the input 19 of the first phase of the second stator. The same is true for the other two phases. Furthermore, outputs 13, 17 and 21 of the second stator are connected together to the same neutral. The inputs of the three phases AE, BE and CE are made to the inputs of the three phases of the first stator, in other words on notches 1, 5 and 9. This layout means that a practically axial rotating field can be obtained.

In the winding in the described embodiment, there are four poles, 2 p pairs of poles per phase with a winding in coils and by "consequent poles". With twenty-four notches=Z total, the total of notches per pole and per phase $$m = \frac{z}{3 \times 2p} = 2.$$

One coil-occupies four notches. The Forward conductors from the first two notches of the coil are offset by six notches=3×m from the Return conductors from this coil.

In general, this offset is equal to 3.m for a winding by "consequent poles" and $$3 \cdot \frac{m}{2}$$

for a winding by "poles" if m is a multiple of 2.

In general, the two stators 1A and 1B are strictly identical. Each stator contains the same total number of notches Z which is a multiple of three for three-phase motors. Each winding is characterized by the number of notches per pole and per phase $$m = -\frac{z}{3 \times 2p} = 2.$$

This number is usually integer, but may be fractional in special applications. In this special case, the coils or sections making up a single phase are not identical, but the three phases remain identical except for the angular offset of 120°.

For each stator, phases 2 and 3 are identical to phase 1 except that they are offset by 120° and 240°, and therefore by a notch pitch of 2.m and 4.m.

Stators 1A and 1B are wound identically. The connection of the windings for the two stators 1A and 1B are made as follows. The two stators 1A and 1B are laid out facing each other, with the two wound surfaces opposite each other. Notch 1 on stator 1A is made to coincide with notch 1 on stator 1B. Stator 1A or stator 1B is then rotated by an angle $$= 3 \cdot m \frac{360°}{z}.$$

Phases 1 on stators 1A and 1B are connected in series. In this way, the input of phase 1 corresponds to the input of resultant phase 1 of the stator 1A and its output corresponds to the output of phase 1 of the stator 1B.

The same procedure is used for phases 2 and 3.

I claim:

1. Asynchronous discoidal electric motor comprising:

a discoidal shaped rotor (2) with two radial faces (20) and mounted to rotate about an axis of rotation (A); and a stator composed of two parts (1A, 1B) placed on each side of the radial faces (20) of the rotor (2) and each part (1A, 1B) having a radial face (10), each stator face having windings (13) placed facing the rotor (2) characterized in that the windings (13) of the stator parts (1A, 1B) are identical and placed in a known number of radial notches (12) to form a known number of poles and a known number of phases, the notches having a narrow slit (11) such that each notch (12) is closed, the stator parts (1A, 1B) being offset by one complete polar pitch, a polar pitch being three times the number of radial notches divided by both the number of poles and by the number of phases.

2. Motor according to claim 1, characterized in that the windings (13) of the stator (1A, 1B) are surrounded by a casing (14) made of a dielectric insulating material.

3. Motor according to claim 1, characterized in that the rotor (2) has a cartwheel shaped radial surface (20) with two external (23) and internal (24) rings, and radial bars placed in radial notches (22).

4. Motor according to claim 3, characterized in that the radial notches (22) in the rotor (2) are skewed so that a line drawn collinearly with any one of the notches would not intersect the axis of rotation (A).

5. Motor according to claim 4, characterized in that notches (22) of the rotor (2) each have two cavities (31, 32) at different depths so that the motor can start with a sufficiently large torque and with an acceptable start up current.

6. Motor according to claim 3, characterized in that the rotor (2) notches (22) have a narrow slit (21) such that each notch (22) is almost closed.

7. Motor according to claim 1, characterized in that the radial notches (12) in the stator (1A, 1B) are skewed so that a line drawn collinearly with any one of the notches would not intersect the axis of rotation (A).

8. Motor according to claim 1, characterized in that the rotor (2) has two cartwheel shaped radial surfaces (20) each having radial notches (22), two external rings (23), two internal rings (24), and radial bars placed in the radial notches (22).

9. Asynchronous discoidal electric motor comprising:
   a discoidal shaped rotor (2) with two radial faces (20) and mounted to rotate about an axis of rotation (A); and
   a stator composed of two parts (1A, 1B) placed on each side of the radial faces (20) of the rotor (2) and each part (1A, 1B) having a radial face (10), each stator face having windings (13) placed facing the rotor (2) characterized in that the windings (13) of the stator parts (1A, 1B) are identical and placed in a known number of radial notches (12) to form a known number of poles and a known number of phases, the notches having a narrow slit (11) such that each notch (12) is closed, the stator parts (1A, 1B) being offset by one complete polar pitch, a polar pitch being three times the number of radial notches divided by both the number of poles and by the number of phases, and the windings for both stator parts each have three phases, each phase having an input and an output, the output of the first phase of the first stator part is connected to the input of the first phase of the second stator part, the output of the second phase of the first stator part is connected to the input of the second phase of the second stator part, and the output of the third phase of the first stator part is connected to the input of the third phase of the second stator part.

10. Motor according to claim 9, characterized in that the outputs of the three phases of the windings of the second stator part are connected to a neutral.

11. Process for manufacturing a notch (12, 22) in a stator (1A, 1B) or a rotor (2) of an asynchronous discoidal electric motor by electrochemical machining using a wire (30) with a width less than or equal to the width of an entry slit for the notch (12, 22), the notch having an axis and a cross-sectional area defined by the stator or rotor, comprising the steps of:
   placing the wire parallel to an axis of the notch;
   moving the wire in a direction perpendicular to the axis so as to traverse the cross-sectional area of the notch.

* * * * *